United States Patent
Fox et al.

(10) Patent No.: US 7,346,740 B2
(45) Date of Patent: Mar. 18, 2008

(54) TRANSFERRING SPECULATIVE DATA IN LIEU OF REQUESTED DATA IN A DATA TRANSFER OPERATION

(75) Inventors: Travis D. Fox, Edmond, OK (US); Edwin S. Olds, Edmond, OK (US); Mark A. Gaertner, Vadnais Heights, MN (US); Abbas Ali, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 865 days.

(21) Appl. No.: 10/602,254

(22) Filed: Jun. 23, 2003

(65) Prior Publication Data

US 2004/0088480 A1    May 6, 2004

Related U.S. Application Data (60) Provisional application No. 60/423,102, filed on Nov. 1, 2002.

(51) Int. Cl.
*G06F 13/00* (2006.01)

(52) U.S. Cl. ............... 711/137; 711/113; 711/112; 711/158; 369/30.01; 369/30.23

(58) Field of Classification Search ............... 711/158, 711/112, 113, 137; 369/30.01, 30.23
See application file for complete search history.

(56) References Cited

U.S. PATENT DOCUMENTS 5,422,890 A    6/1995  Klingsporn et al.
6,339,811 B1    1/2002  Gaertner et al.
6,449,111 B1    9/2002  Kool et al.
6,487,631 B2   11/2002  Dickinson et al.
2002/0052985 A1*  5/2002  Furuumi et al. ............... 710/5
2002/0174293 A1  11/2002  Fox et al.
2002/0178326 A1* 11/2002  Ohta et al. ................... 711/113
2003/0056059 A1   3/2003  Fox et al.
2003/0056060 A1   3/2003  Hertz et al.
2003/0105919 A1*  6/2003  Olds et al. ................... 711/113
2003/0200386 A1* 10/2003  Hertz et al. ................. 711/113

OTHER PUBLICATIONS

The Cache Memory book, Jim Handy, Academic Press, Inc., 1993, pp. 5-8 and 64-84.*

* cited by examiner

*Primary Examiner*—Hong Kim
(74) *Attorney, Agent, or Firm*—Fellers, Snider, et al.

(57) ABSTRACT

Method and apparatus for transferring speculative data in lieu of requested data in a data transfer operation. First data are transferred in response to an execution of a first pending command. Speculative data are transferred instead of second data associated with a second pending command during a next available latency period for the second data, preferably when the speculative data are adjudged as having a utility greater than a utility of the second data. The first and second commands are preferably received in a queue and a command execution algorithm identifies the second command as a next best command to be executed after execution of the first command. The above steps are preferably carried out by a controller of a data storage device.

21 Claims, 5 Drawing Sheets

TRANSFERRING SPECULATIVE DATA IN LIEU OF REQUESTED DATA IN A DATA TRANSFER OPERATION

RELATED APPLICATIONS

This application claims priority to U.S. Provisional Application No. 60/423,102 filed Nov. 1, 2002, entitled Method and Algorithm for Adaptive Read Lookahead Extension In A Disc Drive.

FIELD OF THE INVENTION

This invention relates generally to the field of magnetic data storage devices, and more particularly, but not by way of limitation, to adaptively extending read look ahead for a data storage device.

BACKGROUND

Data storage devices (DSD) store data and include a mechanical portion, or head-disc assembly (HDA) and an electronics portion, or printed circuit board wiring assembly (PWA), controlling functions of the HDA while providing a communication interface between the HDA and a host being serviced by the DSD.

The HDA has a disc, with data recorded on a recording surface, rotated at a constant speed by a motor assembly, the data is accessed by a read/write head of an actuator assembly positionably controlled by a closed loop servo system.

The data storage device market continues to place pressure on the industry for DSD's with higher rates of data throughput. Reading and storing data beyond requested data in a cache may satisfy future host read requests, thereby eliminating the need for mechanical access. This process of reading and storing additional information is known as reading speculative read data. Improving accuracy of speculative data acquisition would advantageously improve data throughput.

As such, challenges remain and needs persist for improved speculative data acquisitions methods.

SUMMARY OF THE INVENTION

In accordance with preferred embodiments, a method for determining a speculative data acquisition in conjunction with an execution of the first disc command relative to an execution of the second disc command through execution of the read look ahead routine is provided.

The method includes identifying first and second access commands, and acquiring speculative data in conjunction with an execution of the first access command in lieu of executing the second access command when the utility of the acquired speculative data is greater than the utility of executing the second access command, wherein the speculative data is acquired over a deducing time period for acquiring the speculative data, and in which the speculative data acquired in conjunction with an execution of the first access command is data having utility greater than the utility executing the second command is based on an analysis of previous read accesses in conjunction with an analysis of access commands present in the memory.

In one aspect of the present invention, the deduced time period commences with the conclusion of execution of the first access command, extends beyond an access time and an execution time for the second access command and concludes with a commencement of sufficient time for execution of a third access command.

In another aspect of the present invention, the deduced time period is a period of time based on a time to acquire a predetermined amount of data. In still another aspect of the present invention, the deduced time period preferably commences with the conclusion of execution of the first access command and concludes with preservation of sufficient time for executing the second access command.

In still further another aspect of the present invention, the deduced time period for acquiring the data following the first access command is a deduced amount of data determined by an available latency period associated with a second access command.

These and various other features and advantages that characterize the claimed invention will be apparent upon reading the following detailed description and upon review of the associated drawings.

DETAILED DESCRIPTION

Figure 1:
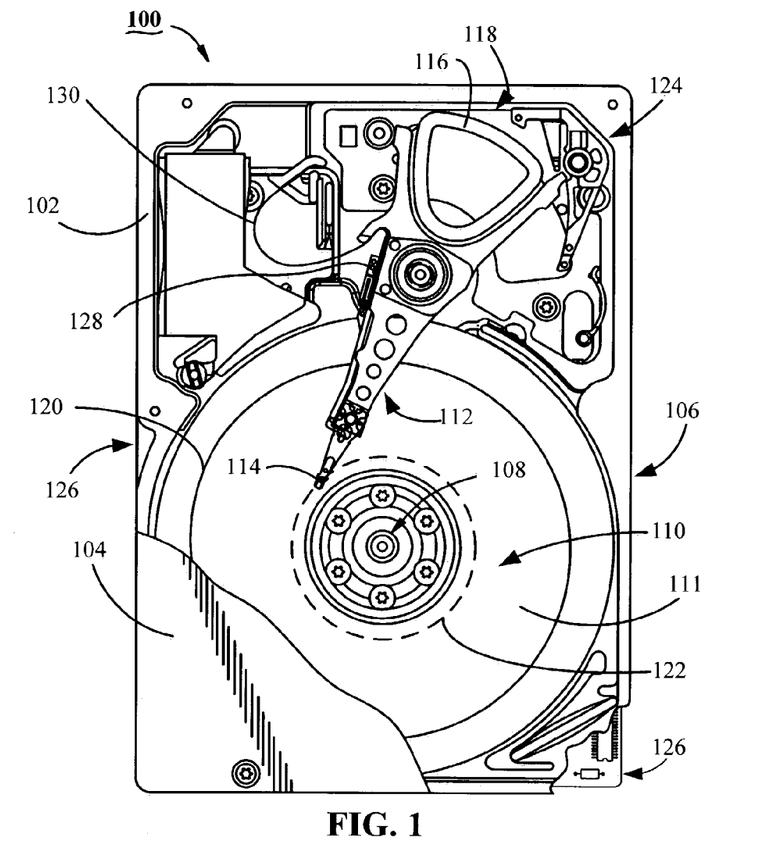
FIG. 1 is a top plan view of a data storage device constructed and operated in accordance with preferred embodiments of the present invention.

Referring now to the drawings, FIG. 1 provides a top plan view of a data storage device 100 (also referred to as DSD 100). The DSD 100 includes a rigid base deck 102 cooperating with a top cover 104 (shown in partial cutaway) to form a sealed housing for a mechanical portion of the DSD 100, typically referred to as a head-disc assembly 106. A spindle motor assembly 108 (also referred to as motor 108) rotates a number of data storage discs 110 with a magnetic recording surface 111 at a substantially constant speed. A rotary actuator 112 (also referred to as actuator 112) supports and rotates a number of read/write heads 114 adjacent the magnetic recording surface 111 when current is applied to a coil 116 of a voice coil motor (VCM) 118.

During operation of the DSD 100, the actuator 112 moves the heads 114 to an information data tracks 120 of the magnetic recording surface 111 to write data to and read data from the disc 110. When the DSD 100 is deactivated, the actuator 112 positions the heads 114 adjacent a home position 122 and the actuator 112 is confined by latching a toggle latch 124.

Command, control and interface electronics for the DSD 100, are provided on a printed circuit board assembly 126 mounted to the head-disc assembly 106. Operational control of the data storage device is provided by firmware executed by a top level control processor (not separately shown) of the printed circuit board assembly 126. During data transfer operations, a preamplifier/driver (preamp) 128 attached to a flex circuit 130, conditions read/write signals conducted by the flex circuit 130 between the printed circuit board assembly 126 and the read/write head 114.

Figure 2:
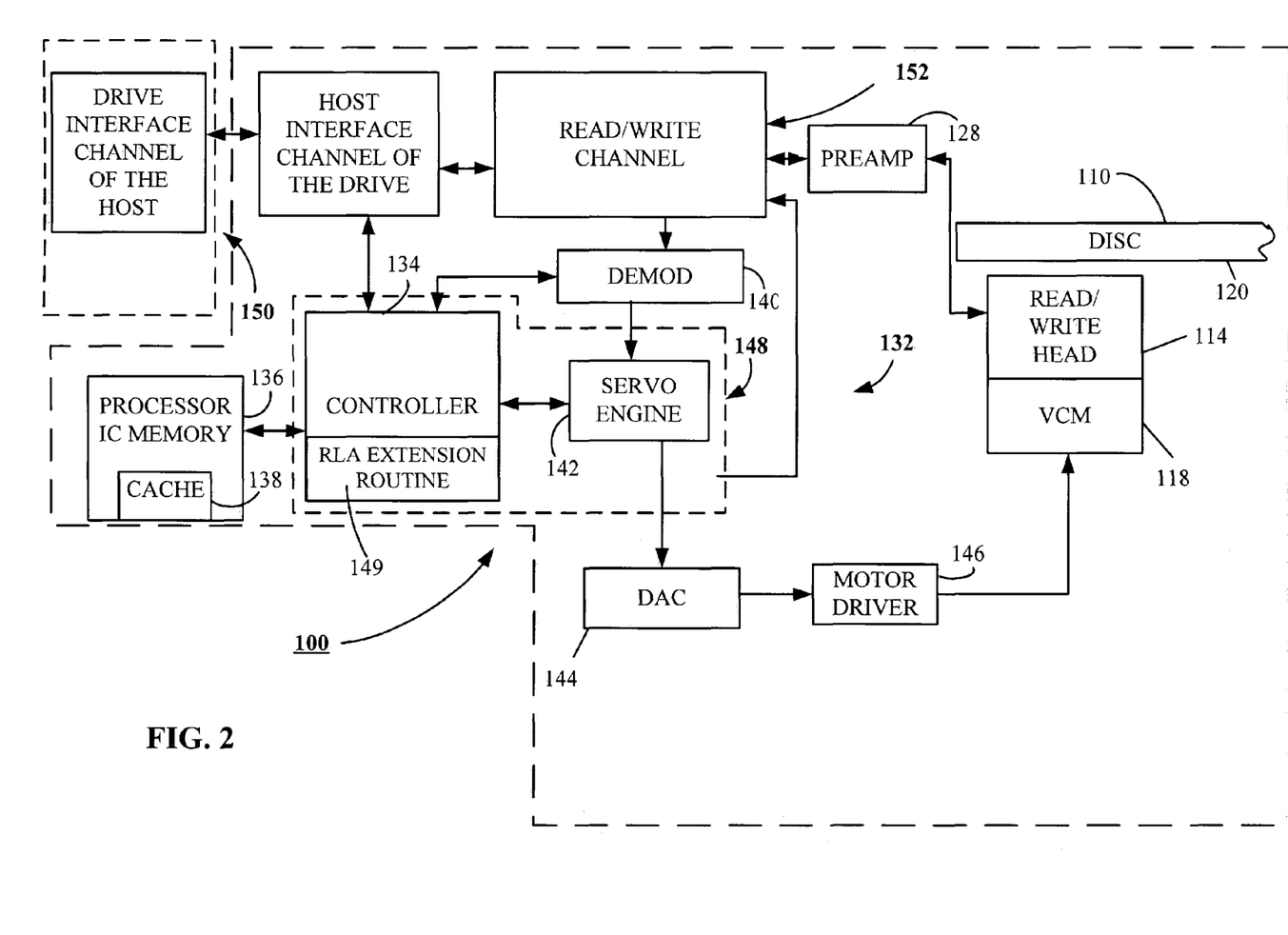
FIG. 2 is a functional block diagram of a circuit for controlling operation of the data storage device of FIG. 1, the circuit programmed with a read look ahead (RLA) extension routine.

Turning to FIG. 2, position-controlling of the read/write head 114 is provided by the positioning mechanism (not separately shown) operating under the control of a servo control circuit 132 programmed with servo control code, which forms a servo control loop.

The servo control circuit 132 includes a micro-processor controller 134 (also referred to herein as controller 134), a memory 136, a cache memory 138, a demodulator (DE-MOD) 140, an application specific integrated circuit (ASIC) hardware-based servo controller ("servo engine") 142, a digital to analog converter (DAC) 144 and a motor driver circuit 146. Optionally, the controller 134, the random access memory 136, and the servo engine 142 are portions of an application specific integrated circuit 148.

The components of the servo control circuit 132 are utilized to facilitate track following algorithms for the actuator 112 (of FIG. 1) and more specifically for controlling the voice coil motor 118 in position-controlling the read/write head 114 relative to the selected information track 120.

In addition to the servo control code programmed into an application specific integrated circuit 148, the control code is also programmed into the application specific integrated circuit 148 for use in executing and controlling data transfer functions between a host 150 and the DSD 100. Data received from the host 150 is placed in the cache memory 138 for transfer to the disc 110 by read/write channel electronics 152, which operates under control of the controller 134. Read data requested by the host 150, not found in cache memory 138, are read by the read/write head 114 from the information track 120, and then processed by the read/write channel electronics (channel) 152 and stored in the cache memory 138 for subsequent transfer to the host 150.

A portion of the random access memory 136 is used as a cache memory 138 for storage of data read from the information track 120 (of FIG. 1) awaiting transfer to a host connected to the DSD 100. The cache memory is also used for write-back cache, storage of data transferred from the host to the DSD 100 to be written to the information track 120. The information track 120 is divided into a plurality of data-sectors of fixed length, for example, 512 bytes.

Similarly, the cache memory 138 portion of the random access memory 136 is preferably, and not by way if a limitation, sectioned into a plurality of data blocks of fixed length with each data block substantially sized to accommodate one of the plurality of fixed length data-sectors of the information track 120. For example, under a buffer memory or cache management scheme, the plurality of data blocks are grouped into a plurality of fixed length memory segments within an 8 MB cache memory.

For purposes of enhancing an understanding of the disclosure of the present invention, and absent the imposition of limitations on the scope of the present invention, the cache memory supports a plurality of fixed length segments. As cache memory is needed to store data read from the disc 110, segments are assigned via pointers in the control code. Once a segment has been assigned, that portion of the cache memory is consumed in its entirety. In addition to the use of a portion of the memory available to the DSD 100 as cache memory, memory is also used for storing commands in an execution queue, as well as for storage of various operational needs of the DSD 100 as discussed further herein below.

Because allocation of the amount of memory (of the memory 136) dedicated to cache memory 138 is limited, effective utilization of the cache memory 138 is important to the overall operating performance of the DSD 100. To maximize the effective utilization of the cache memory 138, un-requested data (i.e., speculative data [data having a future probability of being requested by the host 150]) in addition to host data (i.e., the data requested by the host 150) is frequently retrieved from the disc 110 during a seek operation and placed in the cache memory 138.

Speculative data portion may include data preceding the host data portion (read on arrival data) and data subsequent to the host data portion (read look ahead data).

Speculative data is gathered and stored in the cache memory 138 in an attempt to avoid a future mechanical seek to the disc 110 for data requested by the host 150. By satisfying a request for data from the host 150 out of the cache memory 138, use of the mechanical components of the DSD 100 is avoided, thereby increasing data transfer performance by the DSD 100.

Keeping in mind the limited storage space made available for the cache memory 138, and to maximize avoidance of the use of the mechanical components of the DSD 100 for servicing a request for data by the host 150, the present invention utilizes an adaptive read look ahead (RLA) extension routine 149. The RLA extension routine 149 improves the utility of speculative data acquired by acquiring an increased amounts of speculative for data with a heightened opportunity of satisfying a future request for data by the host 150 from the cache memory 138, a minimum amount of speculative data for data that has only an opportunity of satisfying a future request for data by the host 150 from the cache memory 138, and no speculative data for data that has only an minimum opportunity of satisfying a future request for data by the host 150 from the cache memory 138.

In a preferred embodiment, latency of a next command is a default for an amount of time allotted for gathering speculative data during a read operation. That is, gathering speculative data without adversely impacting throughput performance. To enhance throughput performance, a determination is made whether or not throughput performance is more likely to improve by extending the amount of time for gathering speculative data beyond the latency of the next command (expanding speculative data).

In other words, information concerning pending operations and/or previous operations is used to determine if there is value or utility (i.e., an opportunity to improve throughput performance) in reading data beyond the latency of the next disc command (also referred to herein as an access command) relative to a utility or value of executing the next access command. Pending access commands of importance can take the form of requests to write data from the cache memory 138 and requests to read data from the disc 110.

Access time is an amount of elapse time between completion of an execution of a access command and a subsequent execution of a next scheduled access command or execution of an access command of interest. Access time includes a seek time (which includes head settle time), set-up time and a latency period.

Seek time is the time taken to move the read/write head 114 to the data track 120 associated with the access command of interest along with the time for the 114 to stabilize relative to the data track 120 and be ready to perform a data exchange operation (either a read or a write). Set-up time is the amount of time taken to adjust the channel 152 to execute the access command of interest in addition to the time to process the access command of interest, and the latency period in an amount of time taken for rotation of the disc 110 beneath the read/write head 114 to align the portion of the data track 120 associated with the access command for execution of the data exchange operation, i.e., execution of the access command of interest. It is noted that, if set-up time falls within the time expended on the seek portion and the latency portion of the access time, it poses no time penalty to the access time.

Requests to write data from the cache memory 138 result from write operations performed in the DSD 100. For write-back cache type write operations, the host 150 receives an indication of successful completion of an issued write command upon the completion of the data transfer to the cache memory 138, rather than upon completion of the actual write.

From a performance throughput perspective, the DSD 100 realizes no value via quickly writing the data from cache memory 138 to the disc 110. If all pending operations are write-backs, expanding speculative data does not cause a degradation of performance. Pending read operations may request data that could be cached by expanding speculative data retrieval.

In a preferred embodiment, queued sequential or nearly sequential read operations are merged into one disc operation; however, some protocol limitations, such as Ordered Tagged commands in SCSI, or timing scenarios may prevent merging. It is clearly beneficial to expand retrieval of speculative data so that queued sequential or nearly sequential read operations will be serviced from cache memory 138.

Previous read operations might also indicate the value of expanding speculative data. If previous read operations strongly indicate a sequential access or a highly local access pattern, expanding speculative data can be valuable. It is likely that a plurality of future read operations would be serviced by data cached from cache memory 138, since they will likely also be sequential or highly local.

In a preferred embodiment, scheduling execution of pending operations is based on a next best command in a command queue available for execution. An amount of time allocated to expanding speculative data may be different depending on the dynamic state of the DSD 100, relative to commands awaiting execution.

For situations that commands in the command queue are unscheduled pending operations, the amount of time allocated may be based on: available cache space; a statically tuned amount of time; or a dynamically determined amount of time based upon the locality of read operations. For scheduled operations, the amount of time allocated to expanding speculative data is an amount that does not increase the access time of a scheduled write-back.

It is noted that expanding speculative data (extending the amount of time for gathering speculative data beyond the latency period of the access time of the next queued command) necessarily means skipping the next best access command for processing, that is the next best disc command (NBDC) in the command queue in favor of acquiring additional speculative data.

The reason that expanding speculative data beyond the latency period of the next queued command necessitates skipping the NBDC (even when the latency period of the access time for executing the NBDC is zero) is because, by consuming an amount of time beyond the latency period what remains of the access time are the seek and set-up components, which have not changed. By the time the remaining two components of the access time have been executed, the portion of the data track 120 associated with the NBDC will have rotated beyond the point of alignment for execution of the NBDC, and an additional revolution of the disc 110 will be needed to realign the portion of the data track 120 associated with the NBDC for execution of the NBDC.

For situations in which only the latency period of the access time is present, expanding speculative data beyond the latency period of the next queued command necessitates skipping the NBDC, because again, the portion of the data track 120 associated with the NBDC will have rotated beyond the point of alignment for execution of the NBDC, and an additional revolution of the disc 110 will be needed to realign the portion of the data track 120 associated with the NBDC for execution of the NBDC.

In either case, consumption of time beyond the latency period of the access time leads to the burning of an extra revolution, and the occurrence of a throughput performance hit, which will be more than offset by future servicing of data requests out of the cache memory 138 as a result of expanding speculative data.

Once a determination is made to skip the NBDC, a next NBDC is looked at to determine a maximum time for expanding speculative data. In other words, gathering speculative data may proceed until exhaustion of, but not beyond, the latency period of the next NBDC, at which time the next NBDC is executed.

Figure 3:
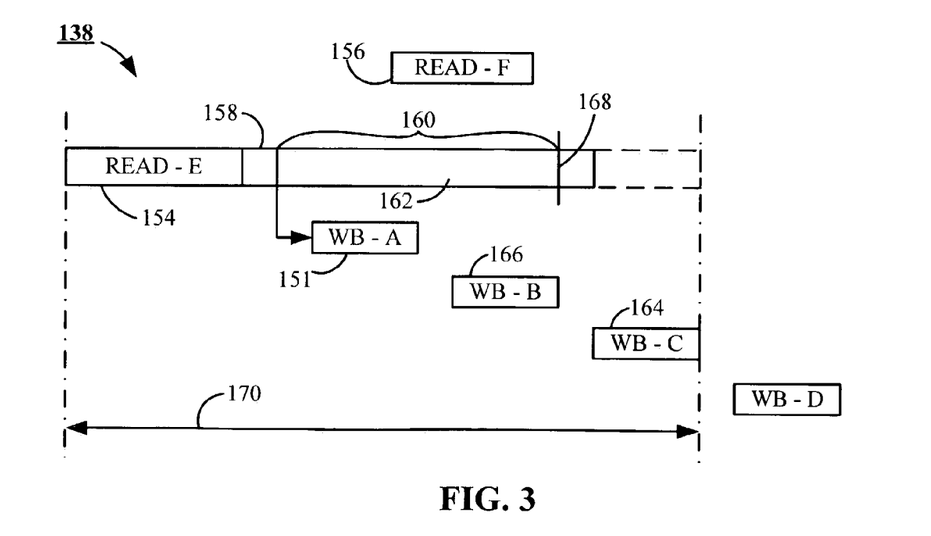
FIG. 3 is a graphical representation of a buffer segment of a cache memory of the circuit of FIG. 2.

FIG. 3 illustrates an example of a benefit gained from expanded speculative data through implementation of a RLA extension routine 149 (of FIG. 2). Without the RLA extension routine 149, WRITEBACK A (WB-A) 151 would be scheduled immediately following the completion of READ-E request 154, (transferring requested read data to cache memory 138). When the host 150 (of FIG. 2) issues READ-F request 156 at a later time, the requested data would not be available in the cache memory 138, and therefore will require a disk access. The reason READ-F request 156 would be unavailable in the cache memory 138, is because without the RLA extension routine 149, the amount of speculative data gathered while executing the READ-E request 154 access command is shown by speculative data portion 158, which falls short of obtaining sufficient data to service READ-F request 156 from cache memory 138.

In other words, the only speculative data gathered following acquisition of the READ-E request 154, is the amount of data that can be read during the latency period of the WB-A 151 access command. With the RLA extension routine 149 implemented, speculative data 160 would include the speculative data portion 158 and an additional speculative data portion 162, which includes data to service READ-F request 156 from cache memory 138.

In this example, it is noted that the expanding speculative data would be calculated and used during gathering of additional speculative data while the controller 134 (of FIG. 2), finds and schedules the next NBDC for execution, which in this example would be WRITEBACK-C (WB-C) 164. Therefore, when the host 150 issues the READ-F request 156 discs command at a later time, that request would result in a cache hit, requiring no disc access to service the request.

One aspect of a preferred embodiment, where an access command such as WRITEBACK-B (WB-B) 166 is not permitted to remain in memory indefinitely but must be executed as the next access command to be executed because, for example, an exhaustion of a predetermined ageing period has expired, the amount of time allocated to expanding speculative data is an amount that does not increase the access time for executing the WRITEBACK-B (WB-B) 166. That is, the conclusion of an amount of time allocated to expanding speculative data commences with a sufficient period of time remaining for the required execution of the WB-B 166.

In this example, the RLA extension routine 149 determined that extending the amount of time for gathering speculative data beyond the latency of the next queued command, WB-A 151, would be advantageous based on the likelihood of future cache hits on the additionally acquired data. The likelihood of future cache hits determination was based on the proximity or relationship of the READ-E request 154 access command to a pattern of previous read accesses (locality, frequency of cache hits, etc.) and queued read accesses. However, based on predetermined criteria, WB-B 166 is not subject to a delay in execution. Once the determination was made to gather speculative data beyond the latency of the next queued command, WB-A 151, the RLA extension routine 149 looks to the access time needed for execution of WB-B 166, upon which an ending time for extended speculative data is determined.

The RLA extension routine 149 programmed into the controller 134 (of FIG. 2) facilitates acquisition of speculative data in conjunction with retrieval of data requested by the host 150 (a FIG. 2), in the presence of pending access commands resident in the cache memory 138 (of FIG. 2).

Figure 4:
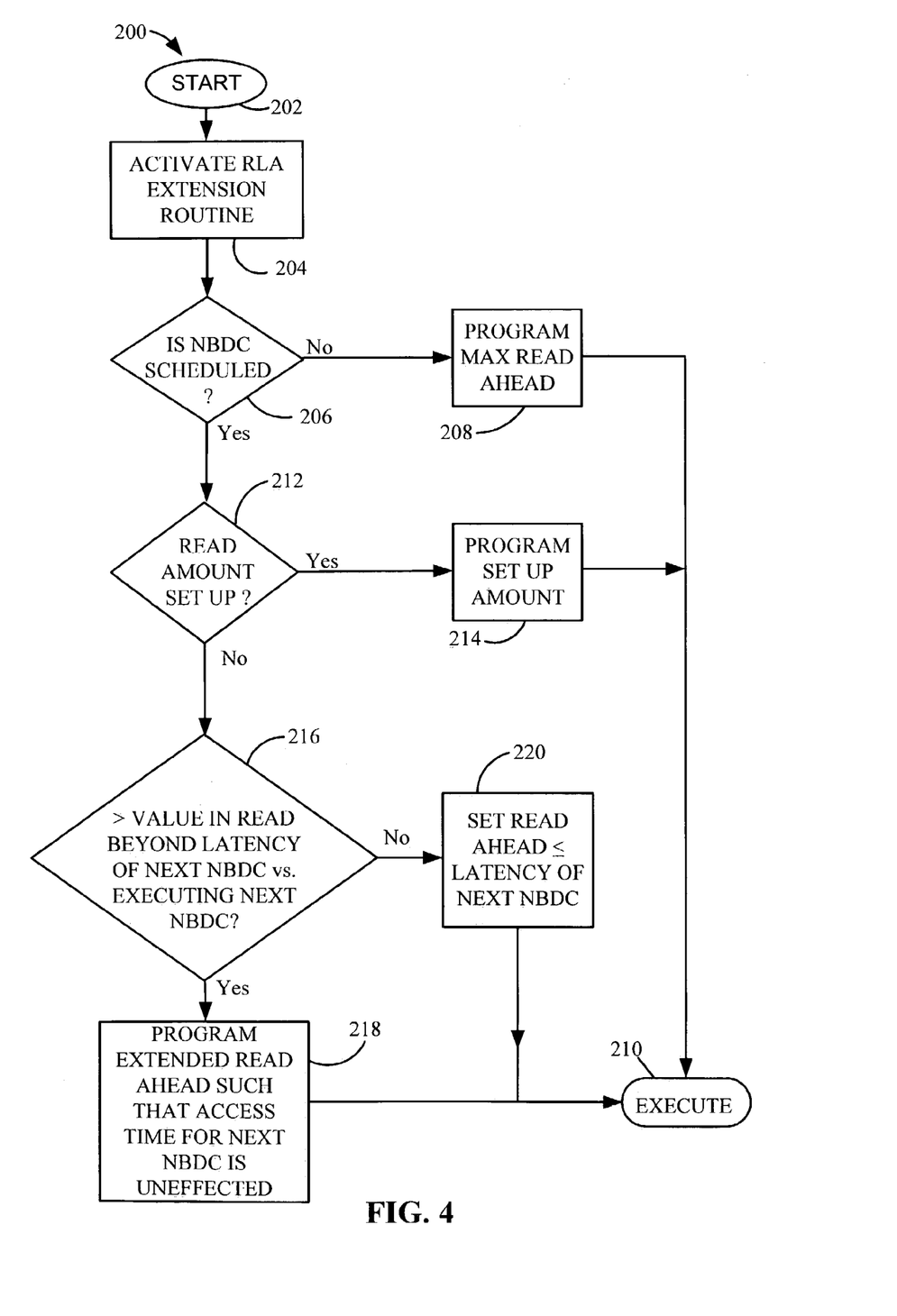
FIG. 4 is a flowchart of an embodiment of the RLA extension routine of FIG. 2.
Figure 5:
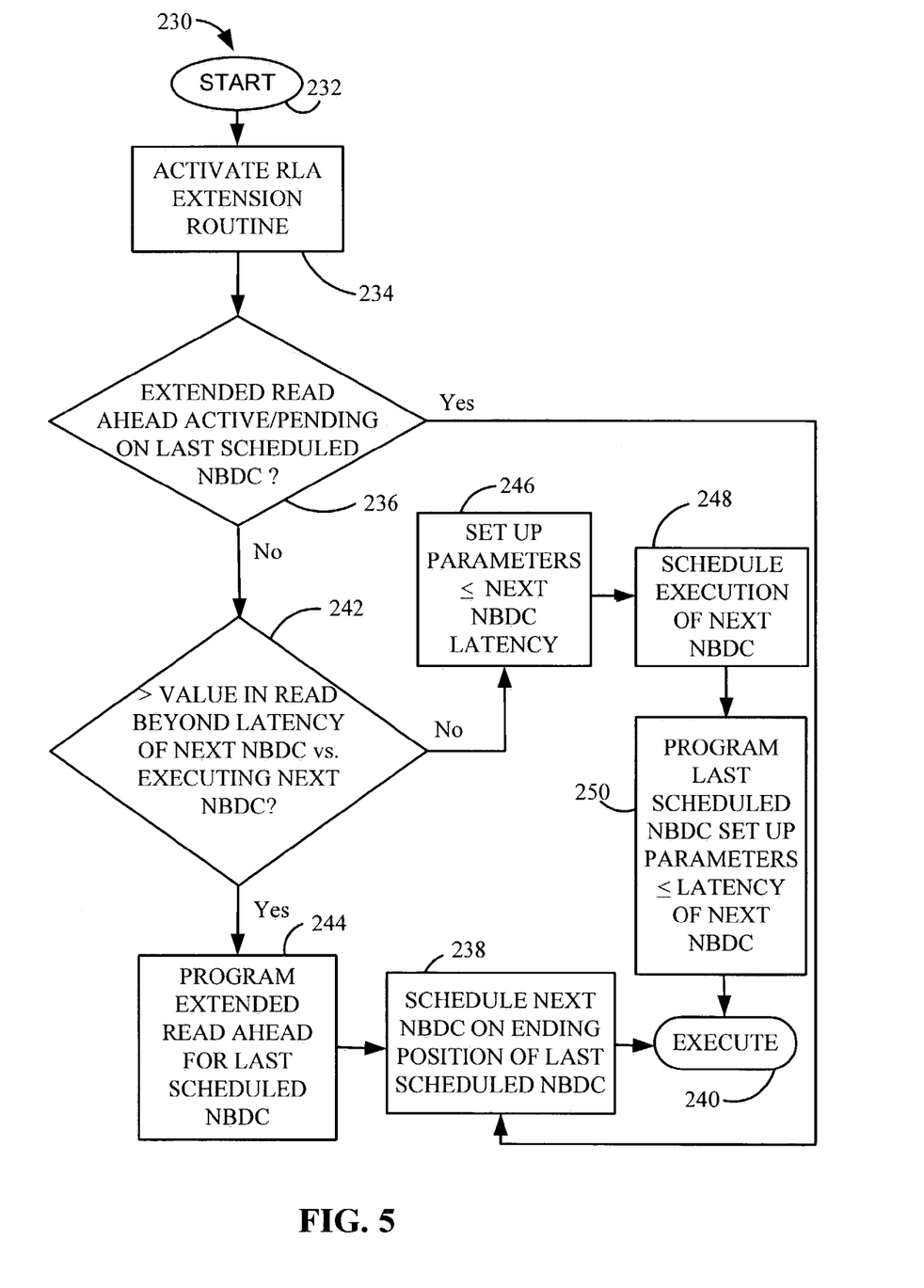
FIG. 5 is a flowchart of an alternate embodiment of the RLA extension routine of FIG. 2.
Figures 6, 7:
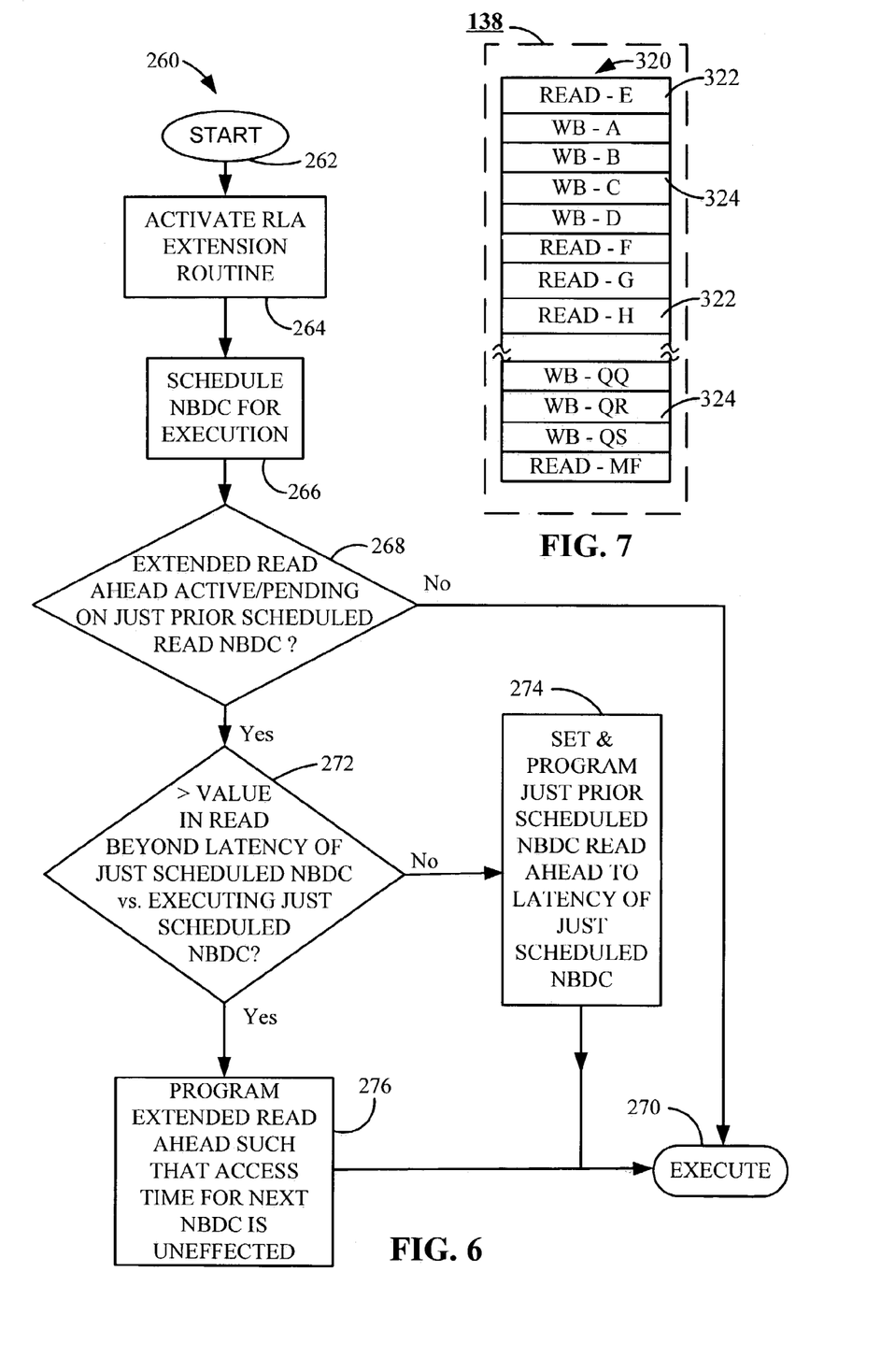
FIG. 6 is a flowchart of a second alternate embodiment of the RLA extension routine of FIG. 2.
FIG. 7 is a diagram of a plurality of disc commands in a command queue of the cache memory of FIG. 2.

FIG. 4 shows a flowchart of steps of the RLA extension routine 149 when starting the read operation. FIG. 5 shows a flowchart of the steps of the RLA extension routine 149 prior to scheduling an access command. While FIG. 6 shows a flowchart of the steps of the RLA extension routine 149 following scheduling of an access command.

As described in more detail below, in conjunction with the discussion of FIGS. 4, 5 and 6, employing the RLA extension routine 149 during execution of access commands, decisions are made to either acquire or not acquire speculative data in conjunction with executing the access command (whether the access command is a write command or read command). When a decision is made to acquire speculative data in conjunction with the execution of the access command, the RLA extension routine 149 also resolves the quantity of speculative data to be acquired, depending on the state of the DSD 100 (of FIG. 1).

Upon starting a read operation, the RLA extension routine 149 executes a begin read process 200, shown by FIG. 4, beginning with start process step 202 and continuing with process step 204 with activation of the RLA execution routine. At process step 206, determination of whether or not a NBDC has been scheduled is made. If the NBDC has not been scheduled, the begin read process 200, progresses to process step 208 and proceeds with setting up a user-defined maximum speculative data acquisition command.

Factors influencing a maximum speculative data acquisition parameter include the amount of available cache memory, the cache memory management methodology incorporated within the DSD 100, and the dynamic perceived value of acquiring speculative data proximate the data region associated with execution of the NBDC. For example, a user may elect to program into the RLA execution routine that a maximum amount of speculative data to be acquired in conjunction with execution of a NBDC is ½ of the remaining available cache memory. The user may also determine that for situations other than execution of an unscheduled NBDC, a predetermined threshold of read hits in a region being serviced by execution of the NBDC is needed, or a predetermined threshold of read access commands need be present in the cache memory, prior to setting the amount of speculative data to be acquired to maximum.

Following process step 208, the begin read process 200 continues at process step 210 with the execution of the NBDC. However, if the end NBDC of process step 206 has been scheduled, the begin read process 200 proceeds to process step 212 where determination of whether or not parameters for acquisition of speculative data in conjunction with the execution of the scheduled NBDC have been set-up (i.e., the amount of speculative data, if any, to be acquired [determined by either volume or time] and the mix between read on arrival data and read look ahead data has been determined).

If the parameters for acquisition of speculative data in conjunction with execution of the scheduled NBDC has been set-up, the begin read process 200 proceeds to process step 214 with programming the set-up parameters into an execution command used to execute the scheduled NBDC, and continues to execution process step 210 with execution of the execution command. If the parameters for acquisition of speculative data in conjunction with execution of the scheduled NBDC have not been set-up, the begin read process 200 proceeds to process step 216.

At process step 216, a determination of relative value of acquiring speculative data in conjunction with execution of the scheduled NBDC is made. If the determination is made that data proximate the region of the disc 110 being serviced by execution of the NBDC is data having a heightened opportunity for servicing future read data requests of the host 150, the RLA execution routine determines the speculative data to be acquired will exceed the latency period of the next NBDC. Once the determination has been made to exceed the latency period of the next NBDC, the RLA execution routine determines the total amount of speculative data to be acquired based on the dynamic state of the DSD 100, establishes the set-up parameters, and proceeds to process step 218. At process step 218, the set-up parameters are programmed into the execution command, which is executed at execution process step 210.

If the determination is made that data proximate the region of the disc 110 being serviced by execution of the NBDC is data having an opportunity for servicing future read data requests of the host 150, the RLA execution routine determines the amount of speculative data to be acquired will not exceed the latency period of the next NBDC. Once the determination has been made to not exceed the latency period of the next NBDC, the RLA execution routine determines the total amount of speculative data to be acquired based on latency period, establishes the set-up parameters as such, and proceeds to process step 220. At process step 220 the set-up parameters are programmed into the execution command, which is executed at execution process step 210.

If the determination is made that data proximate the region of the disc 110 being serviced by execution of the NBDC is data having minimum opportunity for servicing future read data requests of the host 150, the RLA execution routine determines no speculative data will be acquired in conjunction with execution of the scheduled NBDC. Once the determination has been made that no speculative data will be acquired in conjunction with the execution of the scheduled NBDC, the begin read process 200 proceeds to process step 220. At process step 220, the set-up parameters for no acquisition of speculative data are programmed into the execution command, which is executed at execution process step 210.

If the state of the DSD 100 is such that a next NBDC to be executed, scheduled or unscheduled, is an unscheduled access command and expanding speculative data proceeds prior to scheduling the unscheduled NBDC, the RLA extension routine 149 proceeds with a prior to scheduling process 230 in accordance with the steps shown by FIG. 5. The prior to scheduling process 230 commences with start process step 232 and continues with activation of the RLA extension routine 149 at process step 234.

At process step 236, a determination of whether or not the last scheduled NBDC (either active or pending) involved acquisition of speculative data in conjunction with execution of the last scheduled NBDC. If the determination is made that the last scheduled NBDC involved acquisition of speculative data, the process continues at process step 238. At process step 238, the next NBDC is scheduled to commence at the conclusion of execution of the last scheduled NBDC and its associative speculative data acquisition and continues at process step 240 with the sequential execution of the last scheduled NBDC and the next NBDC.

If the determination is made at process step 236 that the last scheduled NBDC did not involve acquisition of speculative data, the process continues at process step 242. At process step 242, a determination of relative value of acquiring speculative data in conjunction with execution of the last scheduled NBDC is made. If the determination is made that data proximate the region of the disc 110 being serviced by execution of the last scheduled NBDC is data having a heightened opportunity for servicing future read data requests of the host 150, the RLA execution routine determines the amount of speculative data to be acquired will not be limited by the latency period of the next NBDC.

Once the determination has been made to not be limited by the latency period of the next NBDC, the RLA execution routine determines the total amount of speculative data to be acquired based on: a predetermined fixed amount of data; a percent of a cache buffer segment (such as 170 of FIG. 3); a percent of available space in the cache memory 138; or a historically based amount based on the hit frequency of the data region, then provides and programs appropriate set-up parameters into the execution command at process step 244, and proceeds to process step 238. At process step 238, the next NBDC is scheduled to commence at the conclusion of execution of the last scheduled NBDC. At process step 240, the last scheduled NBDC and the next NBDC are sequentially executed.

However, if at process 242 the determination is made that data proximate the region of the disc 110 being serviced by execution of the last scheduled NBDC is data having an opportunity for servicing future read data requests of the host 150, the RLA execution routine determines the amount of speculative data to be acquired will not exceed the latency period of the next NBDC.

Once the determination has been made to not exceed the latency period, the RLA execution routine determines the amount of speculative data acquired in conjunction with execution of the last scheduled NBDC will be that data acquired during the latency period of the next NBDC, and establishes the set-up parameters accordingly at process step 246. Process step 248 schedules execution of the next NBDC to coincide with the ending position of the last scheduled NBDC (including acquisition of data associated with the last scheduled NBDC).

At process step 250, the set-up parameters to acquire speculative data in conjunction with execution of the last scheduled NBDC in an amount equal to the latency of the next NBDC are programmed into the execution command for executing the last scheduled NBDC. At process step 238, the last scheduled NBDC and the next NBDC are sequentially executed.

If the determination is made at process step 242 that data proximate the region of the disc 110 being serviced by execution of the last scheduled NBDC is data having minimum opportunity for servicing future read data requests of the host 150, the RLA execution routine determines no speculative data will be acquired in conjunction with execution of the last scheduled NBDC. Once the determination has been made that no speculative data will be acquired in conjunction with the execution of the last scheduled NBDC, the RLA execution routine establishes the set-up parameters accordingly at process step 246.

Process step 248 schedules execution of the next NBDC to coincide with the ending position of the last scheduled NBDC, and at process step 250 the set-up parameters to acquire no speculative data in conjunction with execution of the last scheduled NBDC are programmed into the execution command for executing the last scheduled NBDC. At process step 238, the last scheduled NBDC and the next NBDC are sequentially executed.

FIG. 6 provides a flow chart of steps of an after scheduled process 260 followed by the RLA extension routine 149 when dealing with scheduled access commands. The after scheduled process 260 commences at start process step 262 and continues at process step 264 with activation of the RLA extension routine 149. At process step 266, a NBDC is scheduled for execution.

At process step 268, a determination is made whether or not the just prior scheduled read NBDC (i.e., the NBDC that had been scheduled just prior to scheduling the NBDC at process step 266) has an associated speculative data acquisition command. If not, the after scheduled process 260 proceeds to process step 270 with an orderly execution of the just scheduled NBDC. However, if the determination is made at process step 268, that the just prior scheduled read NBDC has an associated speculative data acquisition, the process proceeds to process step 272.

At process step 272, a determination is made whether or not there is more value in extending acquisition of speculative data beyond the latency of the just scheduled NBDC rather than executing the just scheduled NBDC as soon as possible. If the determination is made that the value in extending acquisition of speculative data beyond the latency of the just scheduled NBDC is insufficient to warrant acquisition of speculative data beyond the latency of the just scheduled NBDC, the after scheduled process 260 proceeds to process step 274.

At process step 274, set-up parameters for acquiring speculative data in conjunction with execution of the scheduled NBDC are selected and programmed into the execution command of the scheduled NBDC to acquire speculative data in an amount determined by the latency of the just scheduled NBDC. Following process step 274, the after scheduled process 26Q proceeds to process step 270 where the scheduled command and the just scheduled command are sequentially executed.

However, if the determination is made at process step 272 that the value in extending acquisition of speculative data beyond the latency of the just scheduled NBDC is sufficient to warrant acquisition of speculative data beyond the latency of the just scheduled NBDC, the after scheduled process 260 proceeds to process step 276. At process step 276, set-up parameters for acquiring speculative data in conjunction with execution of the scheduled NBDC are selected and programmed into the execution command of the scheduled NBDC to acquire speculative data in an amount not to exceed a sufficient amount of time required to access and execute the just scheduled NBDC. In other words, the access time for the just scheduled NBDC remains unaffected. Following process step 276, the after scheduled process 260 proceeds to process step 270 where the scheduled command of process step 268 and the just scheduled command of process step 266 are sequentially executed.

FIG. 7 shows the command queue 320 of the cache memory 138 (of FIG. 2) containing a plurality of read access commands, such as 322, interspersed with a plurality of write-back access commands, such as 324. Absent the use of a command queue prioritization scheduling method, the sequence access commands enter the command queue is the sequence of execution of those access commands by the DSD 100 (of FIG. 1).

To increase the operating efficiency of the DSD 100, and thereby increasing the throughput capabilities of the DSD 100, a command queue activation scheduling method may be used to group access commands in such a way that the number of seeks expended by the DSD 100 to execute the access commands resonant in the command queue is minimized. Whether or not a command queue prioritization scheduling method is employed, the RLA extension routine 149 improves throughput performance of the DSD 100 by improving the probability that acquired speculative data resident in memory 136 (of FIG. 2) will service a subsequent data requests of the host 150 (of FIG. 2).

Acquiring speculative data is more valuable for improving throughput, provided the acquired data is fruitful and servicing a read request from the host 150, then sequentially executing the access commands in the command queue 320. While servicing the command queue 320, the RLA extension routine 149 determines a relative value of acquiring speculative data in conjunction with execution of an access command (either a read access command 322 or a write-back access command 324) in substantially two primary ways.

First, if the following scheduled access command is one or more write-back access commands 324, there is little value in executing the write-back access command 324 as the next access commands executed, because that write-back access command 324 already appears complete to the host 150. Therefore, acquisition of speculative data increases the probability of serving a read request of the host 150 from the cache memory 138, which can improve its throughput performance of the DSD 100.

Second, based on an analysis of the pattern of previous and/or queued read access commands 322, if by executing an access command, a "hot" region of the disc (i.e., an area of the disc that has or will have a high frequency of activity in servicing read request from the host 150) will be accessed, the probability of servicing subsequent read requests from the host 150 heightens. A heightened probability of servicing subsequent read requests of the host 150 out of the cache memory 138 makes the acquired speculative data more valuable for increasing throughput performance of the DSD 100, than would have been achieved by sequentially executing the access commands from the command queue 320 in the same order in which those access commands entered the command queue 320.

Accordingly, embodiments of the present invention are generally directed to a method (such as 220) for determining a speculative data (such as 160) acquisition in conjunction with an execution of the first access command (such as 322) relative to an execution of the second access command (such as 324) through execution of the read look ahead routine.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A method comprising steps of executing a first data transfer command, and delaying completion of a second data transfer command to transfer speculative data in lieu thereof.

2. The method of claim 1, wherein the delaying step further comprises a step of adjudging a utility of the speculative data to be higher than a utility of second data associated with execution of said second command.

3. The method of claim 1, wherein the speculative data are transferred through a next available latency period for the second command.

4. The method of claim 1, wherein the speculative data are transferred during a time period commencing with conclusion of the execution of the first command and concluding prior to a latency period for execution of a third command.

5. The method of claim 1, in which the first command precedes and is directly adjacent the second command in an execution sequence.

6. The method of claim 1, in which the first command precedes and is nonadjacent the second command in an execution sequence.

7. The method of claim 1, wherein the first command is a data retrieval command.

8. The method of claim 1, wherein the second command is a data transmission command.

9. The method of claim 1, wherein the speculative data are acquired in conjunction with first data acquired from execution of the first command.

10. The method of claim 1, in which resolution of the amount of speculative data transferred during the delaying step is resolved to be a predetermined constant amount of data.

11. The method of claim 1, in which resolution of the amount of speculative data transferred during the delaying step is resolved to be a percentage of a buffer segment of a memory.

12. The method of claim 1, in which resolution of the amount of speculative data transferred during the delaying step is resolved based on an analysis of previous commands.

13. The method of claim 1, in which resolution of the amount of speculative data transferred during the delaying step is resolved based on an amount of remaining space within a buffer segment of a memory.

14. A method comprising steps of transferring first data in response to an execution of a first pending command, and transferring speculative data instead of second data associated with a second pending command during a next available latency period for the second command when the speculative data are adjudged as having a utility greater than a utility of the second data.

15. The method of claim 14, further comprising steps of receiving the first and second commands in a queue, and executing a command execution algorithm that identifies the second command as a next best command to be executed after execution of the first command.

16. The method of claim 14, comprising a subsequent step of transferring the second data in response to execution of the second command after the transferring speculative data step.

17. The method of claim 14, wherein the second command is a write-back command.

18. An apparatus comprising a controller configured to execute a first data transfer command, and to delay completion of a second data transfer command to transfer speculative data in lieu thereof.

19. The apparatus of claim 18, wherein the controller is further configured to adjudge a utility of the speculative data to be higher than a utility of second data associated with execution of said second command.

20. The apparatus of claim 18, wherein the controller is further configured to subsequently execute the second command to transfer second data after transfer of the speculative data.

21. The apparatus of claim 18, wherein the controller is characterized as a controller of a data storage device.

* * * * *